(12) United States Patent
Hashimoto

(10) Patent No.: US 6,868,332 B2
(45) Date of Patent: Mar. 15, 2005

(54) DISPLAY SYSTEM

(75) Inventor: Junji Hashimoto, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 13 days.

(21) Appl. No.: 10/323,518

(22) Filed: Dec. 18, 2002

(65) Prior Publication Data

US 2004/0204823 A1 Oct. 14, 2004

(30) Foreign Application Priority Data

Dec. 21, 2001 (JP) ........................................ 2001-389594

(51) Int. Cl.$^7$ .............................................. G01C 21/26
(52) U.S. Cl. .................. 701/200; 701/212; 340/995.26; 348/14.07; 348/14.11
(58) Field of Search ................................ 701/200, 208, 701/211, 212; 340/995.15, 995.26, 995.27; 348/14.07, 14.11

(56) References Cited

U.S. PATENT DOCUMENTS 5,990,975 A * 11/1999 Nan et al. .................... 348/588
2001/0030667 A1 * 10/2001 Kelts ........................... 345/854
2002/0059603 A1 * 5/2002 Kelts ............................. 725/47
2002/0069415 A1 * 6/2002 Humbard ...................... 725/52

FOREIGN PATENT DOCUMENTS

| JP | A-6-99778 | | 4/1994 |
| JP | 411027599 A | * | 1/1999 |
| JP | A-2000-132563 | | 5/2000 |

* cited by examiner

*Primary Examiner*—Gertrude A. Jeanglaude
(74) *Attorney, Agent, or Firm*—Fogg and Associates, LLC; Laura A. Ryan

(57) ABSTRACT

A display system able to display a television screen and a navigation screen, giving due consideration to safe vehicle operation, provided with a screen switching unit for displaying a television screen instead of a navigation screen at least at part of a display screen during display of the navigation screen, a switching instructing unit for instructing switching to the screen switching unit when detecting that a predetermined event has occurred, or a screen area setting unit for setting a specific area in the screen for display by switching by the screen switching unit instead of the switching instructing unit.

15 Claims, 9 Drawing Sheets

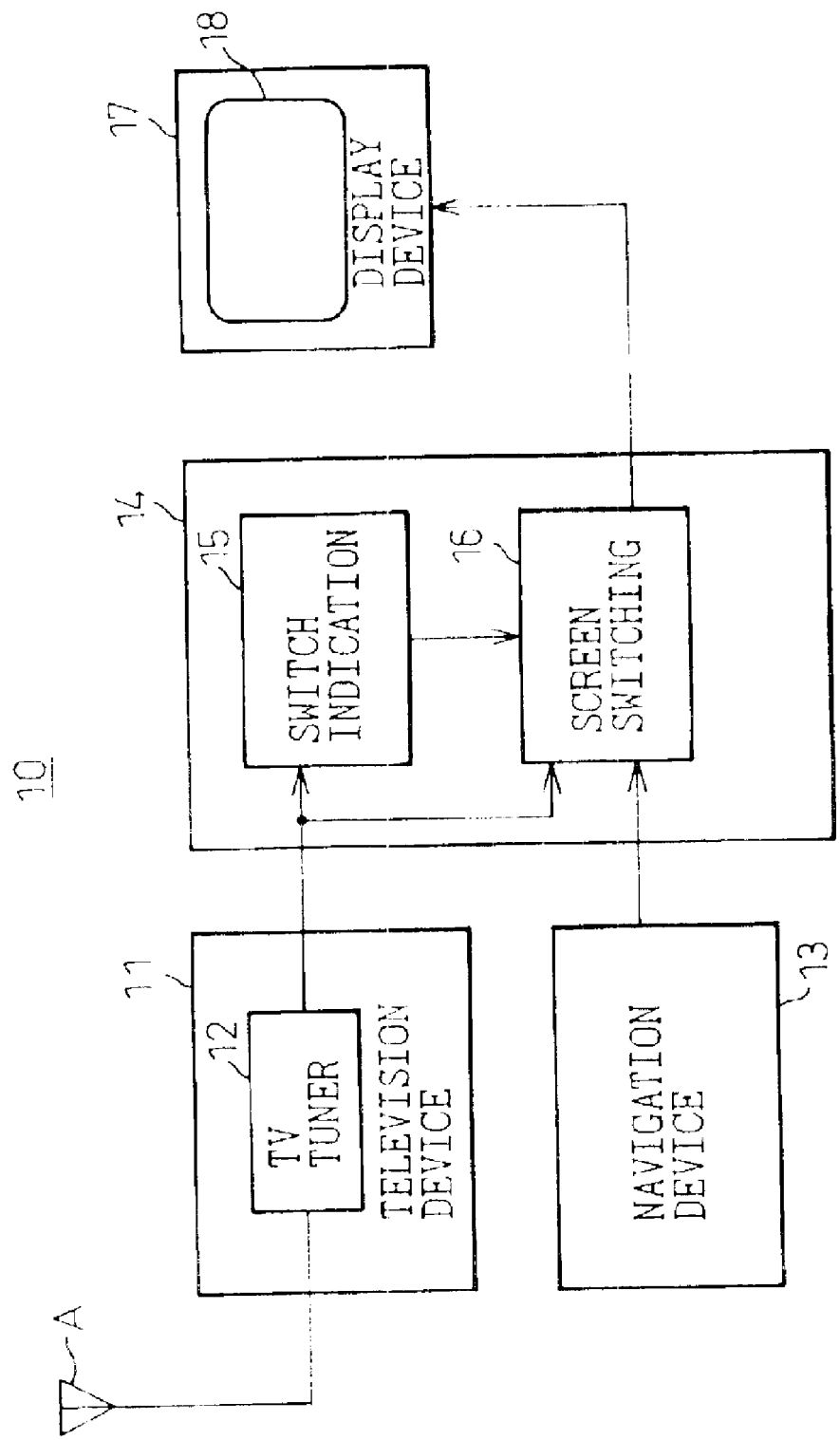

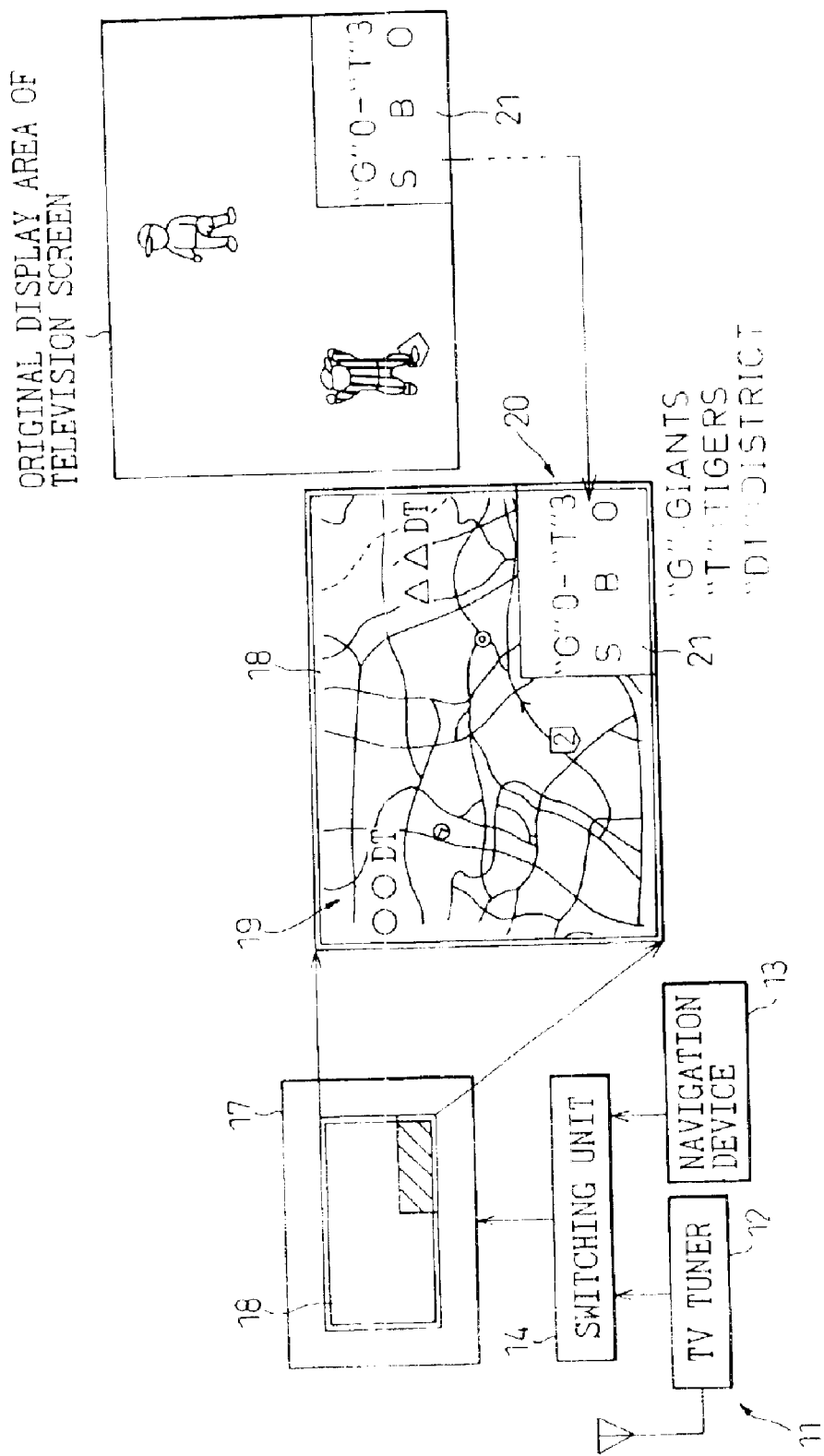

PIP

DUAL SCREENS

MULTISCREENS

DISPLAY SYSTEM

This application claims priority to Japanese Patent Application No. 2001-389594 filed in Japan on Dec. 21, 2001.

BACKGROUND OF THE INVENTION

1. Field of the Invention

The present invention relates to a display system, for example, a display system suitable for a vehicle.

In display systems for vehicles, for example, in recent years the display screen have been made larger. The trend is now for use of a single display screen for not only a navigation screen, but also a television (TV) screen or control screen for an audio device. Another practice has been to split a single display screen into several different screens and provide the user with various types of information on a multiplex screen.

The present invention concerns a display system enabling a single display screen to be shared for a plurality of information screens.

2. Description of the Related Art

Next, a vehicular display system will be explained as an example.

In a vehicle mounting a display system able to display at least a television screen and a screen other than the television screen (here, made a navigation screen) on the same display screen, usually priority is given to the navigation screen in use of the display system.

At this time, sometimes a user driving while using the navigation system will sometimes become curious and frequently switch the display screen to the television function in the hours when for example a baseball game is being broadcast live over the television.

The closer the game, the more curious the user will become about how the game is proceeding and the more frequently he will repeat the operation of switching from the navigation screen to the television screen to learn the score and then again return to the navigation screen. There is the idea of reducing the size of the television screen and superimposing it over part the navigation screen, but if this is done, the television screen becomes extremely hard to view since it is reduced in size and therefore there are problems in safety.

That is, the operation for switching between the navigation screen and television screen is troublesome to the user and obstructs safe driving of a vehicle.

SUMMARY OF THE INVENTION

An object of the present invention is to provide a display system enabling suitable switching between a television screen and screen other than the television screen.

To attain the above object, there is provided a display screen able to display a navigation screen and a television screen, giving due consideration to safe vehicle operation, provided with a screen switching means (16) for displaying a television screen (20) instead of a navigation screen (19) at least at part of a display screen (18) during display of the navigation screen (19), a switching instructing means (15) for instructing switching to the screen switching means (16) when detecting that a predetermined event has occurred, or a screen area setting means (31) for setting a specific area in the screen (20) for display by switching by the screen switching means (16) instead of the switching instructing means (15).

BRIEF DESCRIPTION OF THE DRAWINGS

These and other objects and features of the present invention will become clearer from the following description of the preferred embodiments given with reference to the attached drawings, wherein:

FIG. 1 is a view of a first basic configuration of the present invention;

FIG. 2 is a view of an example of the display screen at a specific timing;

DESCRIPTION OF THE PREFERRED EMBODIMENTS

Figure 3A:
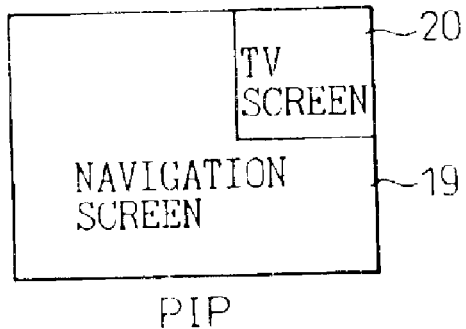
FIGS. 3(a), 3(b), and 3(c) are views illustrating three types of screen switching patterns on a display screen.

Preferred embodiments of the present invention will be described in detail below while referring to the attached figures.

FIG. 1 is a view of a first basic configuration of the present invention.

As shown in the figure, the display system 10 according to the first basic configuration of the present invention is provided with a screen switching means 16 for displaying a television screen at least at part of a display screen 18 in the middle of display of a screen other than the television screen, for example, a navigation screen, and a switching instructing means 15 for instructing switching to the screen switching means 16 when detecting that a predetermined event has occurred at the television screen.

Here, "at least at part of a display screen 18" is a concept including all of the display screen. In this case, the navigation screen ends up completely disappearing.

Further, "predetermined event" is a broad concept indicating a specific program, specific information, etc. designated in advance by the user for the television screen. For example, it is the occurrence of a television screen which the user particularly wants to see, that is, the program of a live broadcast of a baseball game or score information when either of the two teams has scored. The event however is not limited to this. It may also be a soccer match, a favorite movie or music, or news information. That is, it may be any sort of program or information able to be designated by a user. Further, the "screen other than the television screen" includes a television program other than the television screen which the user particularly desires, navigation screen, screen for operating a CD, MD, or other device, vehicle monitor screen, or various other information.

Further augmenting the explanation of FIG. 1, the part including the switching instructing means 15 and screen switching means 16 is expressed as the switching unit 14. The switching unit 14 is arranged between for example a television device (TV device) 11 and navigation device 12 and the display device 17. This display device 17 is formed inside it with the above-mentioned display screen 18.

This display screen 18 preferentially displays for example a navigation screen from the navigation device 13, but also displays a specific program or information obtained from an antenna A through a TV tuner 12 of the TV device 11 at a specific timing.

FIG. 2 is a view of an example of a display screen at a specific timing. Note that throughout the figures, similar components are assigned the same reference numerals or symbols.

In the figure, the left half is equivalent to the configuration of FIG. 1, while the right half shows enlarged a detailed example of the display screen 18.

The figure shows part of the navigation screen 19 switched to a television screen 20 on a single display screen 18 and shows the television screen 20 displaying a specific area screen 21. The figure shows the scene when one team scores during the live broadcast of a baseball game at the above specific timing. That is, it shows the screen at the timing when the "Tigers" score three runs in a game between the "Giants" and "Tigers". Note that it is possible to arrange the television screen 20 (or specific area screen 21) in any way. Next, two or three examples will be shown.

Figure 3B:
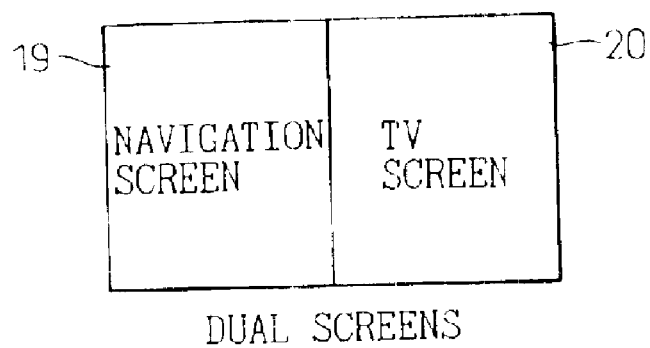
Figure 3C:
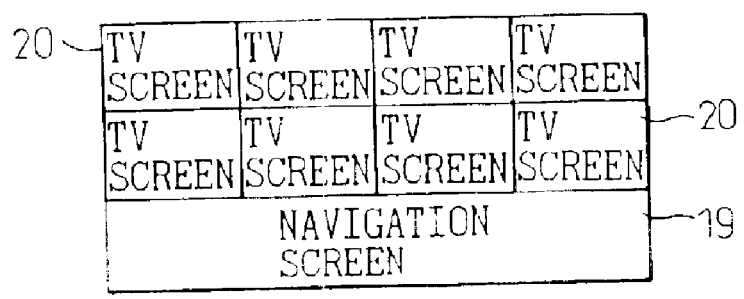

FIGS. 3(a), 3(b), and 3(c) illustrate three types of screen switching patterns in the display screen 18.

FIG. 3(a) is a picture-in-picture (PIP) screen. The specific area screen 21 shown at the right half of FIG. 2 (screen extracting only part of the television screen 20) corresponds to the screen at the top right of FIG. 3(a).

FIG. 3(b) shows two screens, that is, a "double screen", while FIG. 3(c) shows a multiplex screen. It is sufficient to select the optimum pattern in accordance with the type of the television program or the application of the user.

Figure 4:
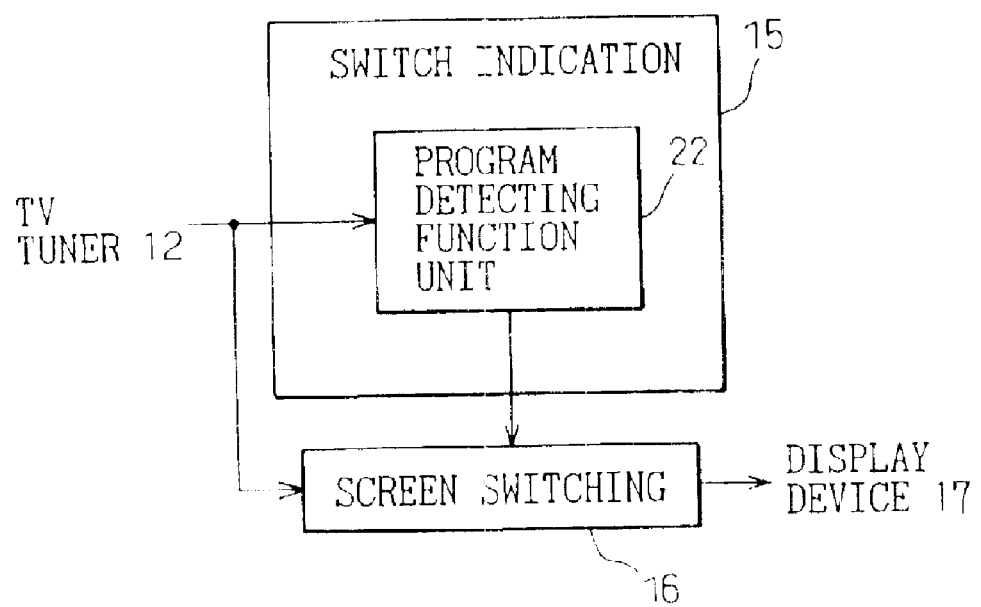
FIG. 4 is a view of a component of the switching instruction means 15 of FIG. 1.

FIG. 4 is a view of a component of the switching instructing means 15 of FIG. 1.

That component is a program detecting function unit 22. This detects whether a predesignated desire television program has been received or not. When this program detecting function unit 22 detects the desired television program (for example, a live broadcast of a baseball game), the function unit 22 instructs switching of the screen to the screen switching means 16.

In this case, the program detecting function unit 22 can detect if a desired television program is on or not based on program information carried along with television information (image/audio information) by a digital broadcasting wave.

Alternatively, the program detecting function unit 22 can detect the specific information carried along with television information by the digital broadcasting wave and output it to the screen switching means 16. This "specific information" is, according to this example, score information (21 in FIG. 2) when one of the teams in the baseball game scores a run. Audio information may also be added.

When this score information is not output from the digital broadcasting wave, the program detecting function unit 22 can extract features from the output signal of the image actually received by the television device 11 and thereby detect whether the program is the desired television program. This can be realized by an image area extracting unit, image recognizing unit, etc. (explained later). This program detection is preferably performed by a search by switching received frequencies by a TV tuner.

The switching instructing means 15 can instruct the above switching in addition to or in place of the above program detecting function unit 22. This can be easily realized by utilizing the functions normally provided in the navigation device 13. When the situation is one where the user does not require navigation, the desired television information designated in advance by the user is switched to automatically.

Specifically, when the switching instructing means 15 judges if the vehicle is driving on (i) a route frequently driven over in the past or (ii) a monotonous route not requiring the navigation screen 19 by the navigation device 13, it instructs switching to the screen switching means 16.

As routes of the above (i), for example, routes near the home, workplace, or business associates of the vehicle user may be mentioned. This takes note of the fact that a navigation device 13 is usually equipped with a function of storing past data of routes driven over by the vehicle.

As routes of the above (ii), for example, a highway or a single road in the countryside may be mentioned. The navigation device 13, as one of its inherent functions, maintains continuous grasp over the fact that the vehicle is driving on such a highway or single road.

Next, a second basic configuration of the present invention will be explained.

The point of this second basic configuration is illustrated in part at the right half of FIG. 2 in the explanation of the first basic configuration described above. That is, this is the specific area screen 21. Here, as one example, only "Giants 0-Tigers 3" and the strikes, balls, and outs (SBO) are extracted and displayed.

The state of progress of the baseball game is generally displayed at part (right corner etc.) of the scene of the baseball game in the television screen. This is so as not to interfere with the scene.

Since the scene of the live broadcast of the baseball game is shown reduced like in the "TV screen" of FIG. 3, the display of the state of progress of the game ends up being displayed reduced to an extremely small area. Therefore, the user cannot read the display of the state of progress of the game unless squinting and focusing on it. Further, the user does this while driving the vehicle, so there are problems in driving safety. The second basic configuration according to the present invention is meant to solve mainly these problems.

Note that if information relating to the above display of the state of progress of the game (for example, "Giants 0-Tigers 3" and SBO) is externally given from the outside as specific information of the digital broadcast, it is possible to fetch the specific information from the TV tuner 12, convert the specific information to image information, and display it on a specific area screen 21 (FIG. 2). The invention is not limited to this if this specific information is given constantly from the outside, however. In this case, the switching unit 14 (FIG. 1) has to obtain that specific information internally. The second basic configuration of the present invention realizes this.

Figure 5:
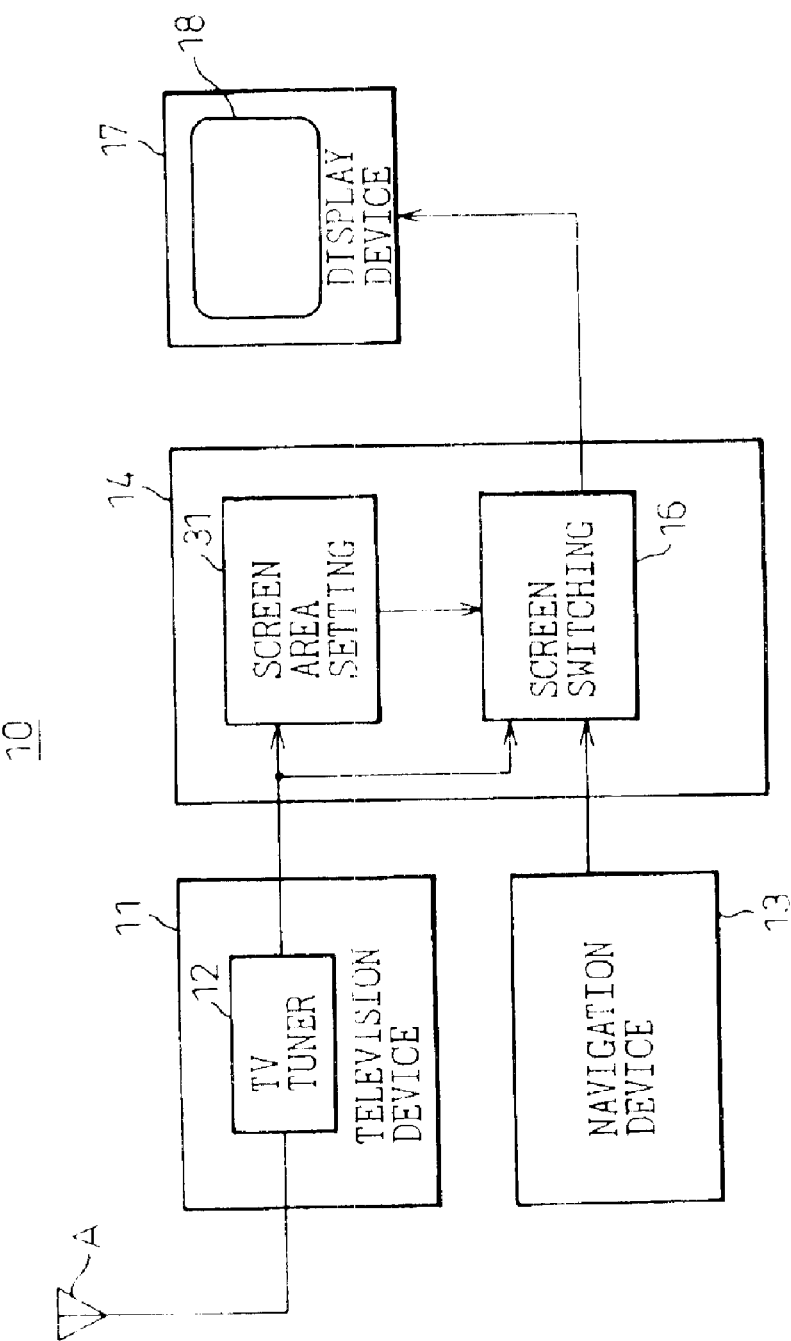
FIG. 5 is a view of a second basic configuration of the present invention.

FIG. 5 is a view of the second basic configuration of the present invention.

As shown in the figure, the display system 10 according to the second basic configuration is provided with a screen switching means 16 for displaying a specific area in the television screen 20 at least at part of the display screen 18 in the middle of display of the navigation screen 19 (FIG. 2). Preferably, it is further provided with a screen area setting means 31 for setting a specific area in the television screen 20 as the television screen 20 to be displayed when switched by the screen switching means 16. The "specific area" spoken of here is a display of the state of progress of the game such as "Giants 0-Tigers 3" and the SBO according to the above example. This becomes the specific area screen 21 (FIG. 2) on the display screen 18. That is, as shown in FIG. 2, only the specific area screen 21 at the right corner of the display area of the television screen originally displayed at the entire display is extracted. That screen 21 is overlaid in the same size on the navigation screen 19. As a result, the screen is switched.

More preferably, provision is made of a change detecting/notifying means.

Figure 6:
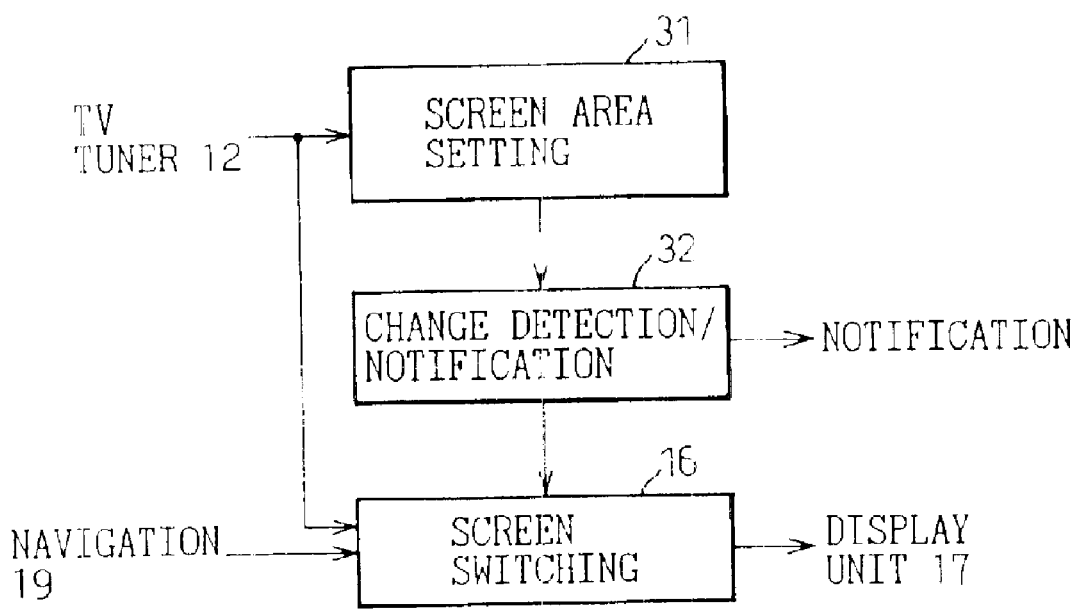
FIG. 6 is a view of a more preferable configuration of a switching unit 14.

FIG. 6 is a view of a more preferable configuration of the switching unit 14.

This figure shows the addition of the change detecting/notifying means 32. The means 32 monitors the image in the above specific area set by the screen area setting means 31, detects when a change has occurred in the image, and provides notification when a change has occurred.

With the configuration of FIG. 5, the user can easily view the minimum amount of information desired to be learned on the display screen 18 as specific information without squinting.

If this specific information is the above-mentioned information of the display of the state of progress of the game ("Giants 0-Tigers 3", SBO, etc.), since this information does not change frequently, conversely the user has to constantly watch for any changes. This also obstructs safe driving of the vehicle.

Therefore, when introducing the above change detecting/notifying means 32, the user need only look at the specific area screen 21 when this means 32 is activated. Alternatively, the specific area screen 21 may be shown on the display screen 18 only when this means 32 is activated.

Note that an embodiment of the hardware of the screen area setting means 31 or the change detecting/notifying means 32 will be explained later.

Explaining the "notification" in the change detecting/notifying means 32 in more detail, when a change in the image on the specific area screen 21 is detected, the user may be notified by any one or any combination of the following (I), (ii), and (iii):
 (i) Notification of a change by sound or voice
 (ii) Notification by the television audio from the television device 11
 (iii) Notification by converting the entire screen on the specific area screen 21 by the television screen from the television device 11

As examples of (I), there are a beeping noise or "three runs scored". The above (ii) and (iii) are the broadcast of the baseball game itself.

Note that each of the above (I), (ii), and (iii) is preferably only for a certain period of time, for example, around 3 seconds.

Further, as a modification of the "notification" in the change detecting/notifying means 32, the following control is possible.

That is, normally, the entire screen of the display screen 18 is set to the navigation screen 19. Only when a change in the image is detected by the change detecting/notifying means 32, the entire screen of the display screen 18 is changed to the television screen from the television device 11 for a certain period of time.

In this case, however, the screen area setting means 31 sets the entire screen of the television screen as the specific area screen 21.

Next, an example of the hardware configuration of the second basic configuration of the present invention will be explained.

Figure 7:
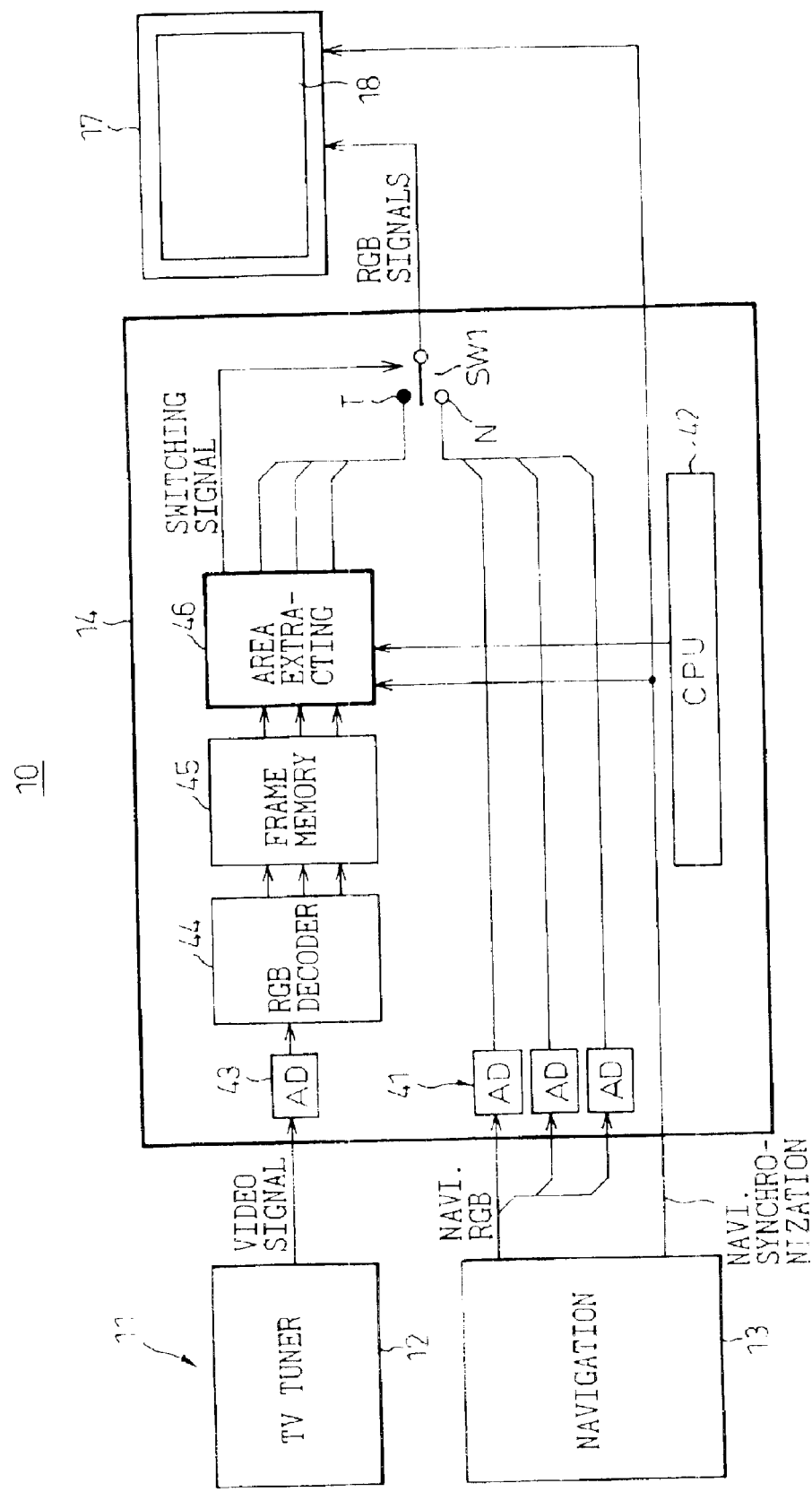
FIG. 7 is a view of an example of the hardware relating to the second basic configuration of the present invention.

FIG. 7 is a view of an example of the hardware according to a second basic embodiment of the present invention. The basic concept can be shown by the hardware of this figure.

The switching unit 14 arranged between the television device 11 and navigation device 13 and the display device 17 is configured exactly the same as in the configuration shown in FIG. 5. In particular, the configuration is as follows when focusing on the switching unit 14.

The analog navigation signal (navi RGB) comprised of R, G, and B from the navigation device 13 is converted to output navigation data of each of R, G, and B by three A/D converters 41.

The RGB navigation data is input to the display device 17 through a switch SW1 normally switched to a navigation side terminal N. The navigation screen 19 illustrated in FIG. 2 is provided to the user.

On the other hand, the analog video signal output from the TV tuner 12 in the television device 11 is first converted to output R, G, and B video data by the A/D converter 43.

The output is converted to R, G, and B demodulated data by a next stage RGB decoder 44. One screen's worth of the RGB signals is successively stored in the frame memory 45. By inputting the RGB signals from the frame memory 45 into the display device 17, the entire screen of the television is shown on the display screen 18.

In the present invention, however, the RGB signals from the frame memory 45 are further controlled and input to the display device 17 through the television side terminal T of the switch SW1. This control is performed by an image area extracting unit 46 in cooperation with the CPU 42.

This image area extracting unit 46 selectively outputs the switching signal, switches the switch SW1 to the television side terminal T, and displays the specific area screen 21 on the display screen 18 only when the raster scan scans a part corresponding to the specific area screen 21 in the one screen's worth of data held in the frame memory 45. In this case, the image area extracting unit 46 and the display device 17 are completely synchronized by the navigation synchronization signal, so the specific area screen will never become displaced relative to the navigation screen.

Note that the image area extracting unit 46 determines which part is to be extracted as the specific area in the one screen's worth of data in the frame memory 45 based on the instruction from the CPU 42.

Figure 8:
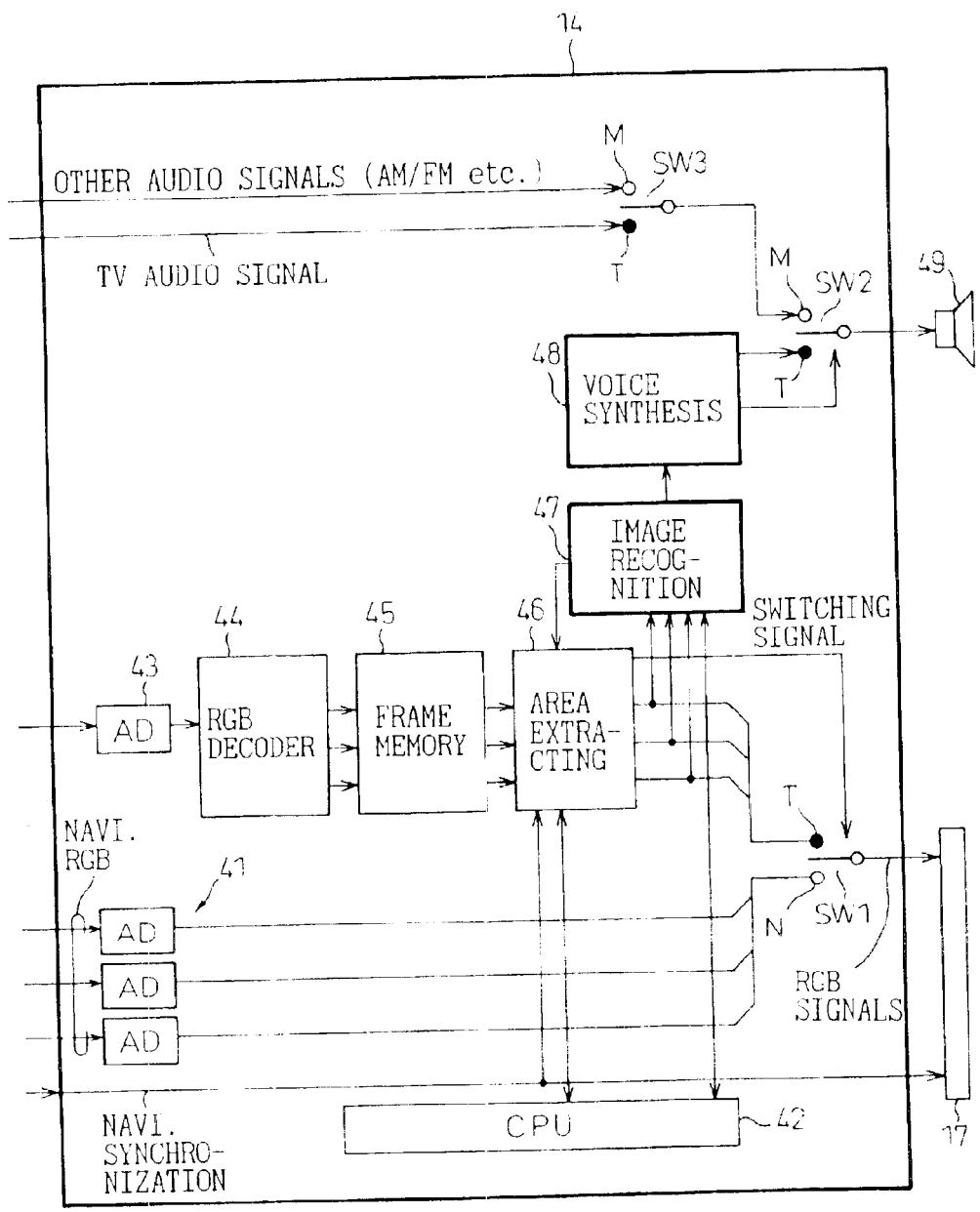
FIG. 8 is a view showing a switching unit 14 of FIG. 7 in more detail.

FIG. 8 is a view of the switching unit 14 of FIG. 7 in more detail.

Compared with FIG. 7, an image recognizing unit 47, voice synthesizing unit 48, and speaker 49 are further added. Along with this, the switch SW2 and the switch SW3 are also added.

The screen area setting means 31 in FIG. 5 is realized in FIG. 8 mainly by the CPU 42 and area extracting unit 46. Further, it sometimes also includes the image recognizing unit 47.

Further, the screen switching means 16 in FIG. 5 is mainly comprised of the CPU 42, image area extracting unit 46, and switch SW1 in FIG. 8. Therefore, the CPU 42, image area extracting unit 46, and image recognizing unit 47 are provided for realizing both of the means 16 and means 31.

As explained above, the screen area setting means 31 also includes the image recognizing unit 47 for setting the specific area in the television screen by extraction of features from the image data generating the television screen being received. This "feature extraction", taking the above example, means extraction of the letters of S, B, O, and other letters by the known edge extraction technique etc. Therefore, according to the above example, the change from "Giants 0-Tigers 0" to "Giants 0 to Tigers 3" can be detected by this image recognizing unit 47. This corresponds to the "detection" of the above-mentioned change detecting/notifying means 32 (FIG. 6).

This "notification" of the change detecting/notifying means 32 may be made by the voice synthesizing unit 48 upon receiving a change of the feature extraction. For example, the statement "The Tigers have scored three runs" is synthesized.

At this time, the switch SW2 is switched to the terminal T side. The other external audio side terminal M is connected to a switch SW3. It is also possible to use this to notify the user of a change in the feature extraction. That is, the TV audio at that time is output from the terminal T of the switch SW3. The terminal T of the switch SW3 is switched to by the CPU 42.

Therefore, the screen area setting means 31 may include an image area extracting unit 46 for extracting image data of a specific area to be output to the image recognizing unit 47, but the image area extracting unit 46 may also be provided with the function of setting the image of the specific area to any position in the television screen and the function of enlarging or reducing the image of that specific area by any ratio. This is to deal with the requests of users in more detail. If giving priority to navigation, the specific area may be reduced, while if giving priority to the baseball game, that specific area may be enlarged.

Various other additional functions may be given to the second basic configuration according to the present invention.

Figure 9:
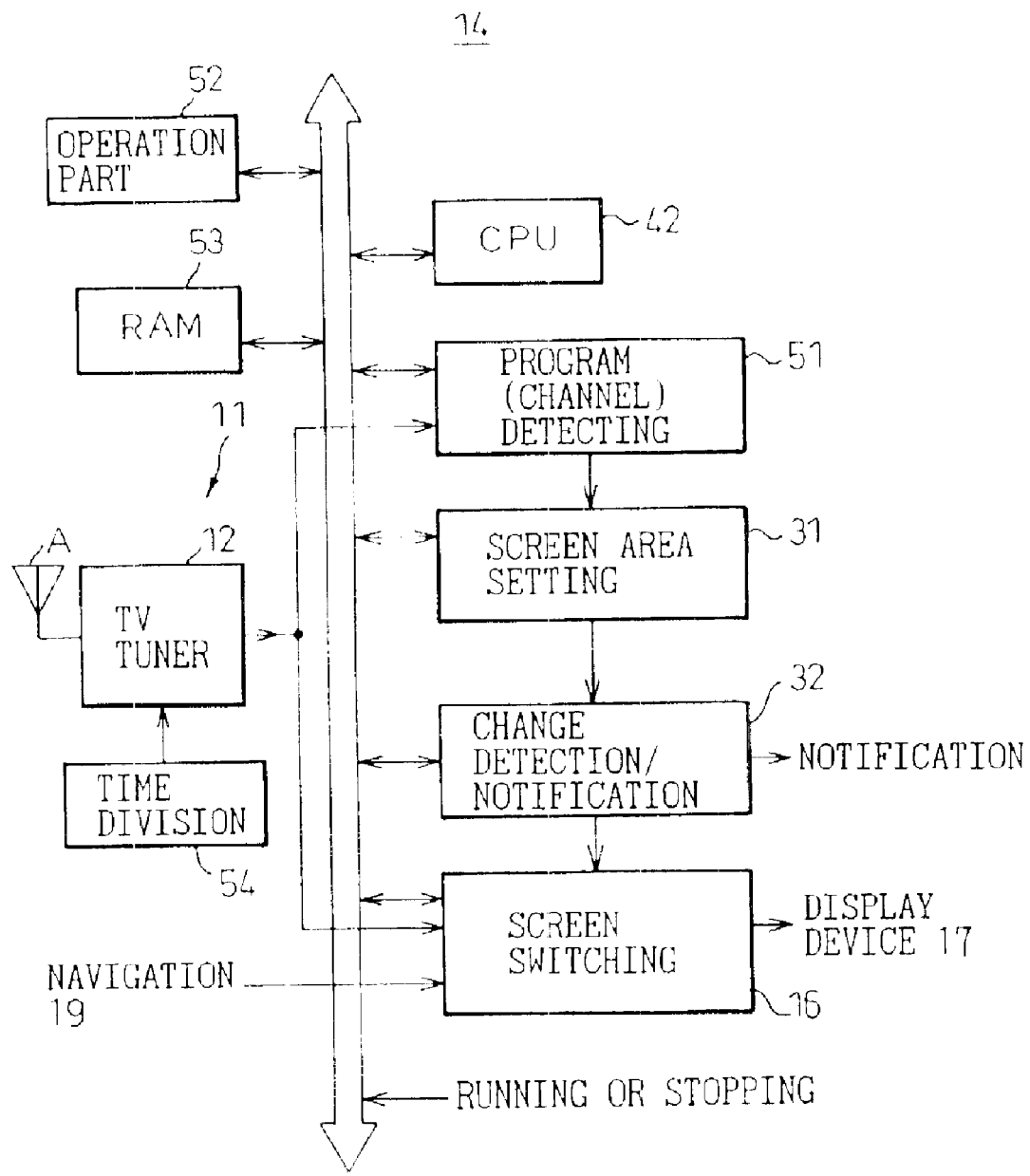
FIG. 9 is a view explaining additional functions relating to the present invention.

FIG. 9 is a view explaining the additional functions according to the present invention.

One of the additional functions is the program detecting means 51 for detecting that a desired program designated in advance by the user has been received. Further, the program detecting means 51 activates the screen switching means 16, the screen area setting means 31, and the change detecting/notifying means 32 when detecting this.

The desired program designated in advance by the user can be input from a control unit 52 of the display system 10 and is stored in the RAM 53.

According to this, normally, the display of the television screen 20 is completely off. That is, the entire screen is used for display of the navigation screen. It is possible to activate the means 16, 31, and 32 only when the desired baseball game or soccer match etc. is being received. Therefore, the principle of giving priority to the navigation screen at all times can be automatically maintained.

Further, using the function of the above program (channel) detecting means 51, the screen area setting means 31 can set the display position of the specific area (21) on the display screen 18 for each television channel received.

What display position is suitable when a particular television channel is received can be preset by the user in the RAM 53 in advance.

Alternatively, it is also possible to extract features such as the strikes, balls, and outs at the image recognizing unit 47 and automatically set the display position for each television channel.

The following settings are also possible for the display position.

Using the illustrated time-division switching unit 54, the television device 11 switches among the plurality of television channels by time division by a single tuner 12. On the other hand, the screen switching means 16 and the screen area setting means 31 display the television screens corresponding to the plurality of television channels on the display screen 18. For example, it displays the screen as shown in FIG. 3(c).

This is convenient when the user has to operate the vehicle during the hours when several favorite programs are being broadcast. For example, sometimes a baseball game, soccer match, and sumo tournament will be broadcast at the same time. In the case of a sumo tournament, there is no specific area displaying the score. In this case, therefore, it is possible to have the image recognizing unit 47 detect the display of the names of the sumo wrestlers superposed on the screen at start of each match by feature extraction and allow just the matches between the wrestlers to be provided to the user upon operation of the screen switching means 16 after a predetermined time limit after detection.

Further, it is also possible for the CPU 42 to obtain information discriminating if the vehicle is moving or at a stop from the engine control computer (MCU) of the vehicle and switch the screen display.

That is, upon reception of an instruction from the CPU 42, the screen switching means 16 can display the navigation screen 19 while the vehicle is moving and, on the other hand, display the television screen 20 when the vehicle is at a stop. This may be done in consideration of driving safety of the vehicle.

Note that when desiring to further improve the safety in driving, it is possible to store the television information at the time of any change in the score information for a certain period of time in the hard disk drive etc. and to redisplay the television information on the display when detecting that the vehicle has come to a stop.

Summarizing the effects of the invention, according to the present invention, the user can simply and easily view the minimum necessary information provided from the display screen 18. In particular, the present invention is useful in an environment such as that of a vehicular navigation system where only a relatively small display screen is available and display of a multiplex screen would make the user feel very uncomfortable.

Further, there are safety problems if constantly displaying a television screen on the full screen while driving a vehicle. By using the present invention to display only a specific area and selectively provide an image close to a still picture, it is possible to efficiently obtain just the necessary information at the required timing and the user is no longer liable to have his attention constantly drawn to the television screen.

While the invention has been described with reference to specific embodiments chosen for purpose of illustration, it should be apparent that numerous modifications could be made thereto by those skilled in the art without departing from the basic concept and scope of the invention.

What is claimed is:

1. A display systems, able to display at least a television screen and a screen other than said television screen on the same display screen, provided with:
    a screen switching section for enabling the display of said television screen at least as part of said display screen when the screen other than said television screen is being displayed; and
    a switching instructing section for instructing switching to said screen switching section when the occurrence of a predetermined event relating to said television screen is detected.

2. A display system as set forth in claim 1, wherein said switching instructing section is a program detecting function unit for detecting if a predesignated desired television program has been received and instructs said switching when the program detecting function unit detects that the program is said desired television program.

3. A display system as set forth in claim 2, wherein said program detecting function unit detects if a program is the desired television program based on program information carried along with the television information by a digital carrier wave.

4. A display system as set forth in claim 1, wherein said program detecting function unit extracts features from an output signal from a television device producing said television screen to detect if a program is said desired television program.

5. A display system as set forth in claim 2, wherein said program detecting function unit detects specific information carried along with the television information by a digital carrier wave and outputs it to said screen switching section.

6. A display system, able to display at least a television screen and a screen other than said television screen on the same display screen, provided with a screen switching section for enabling the display of a specific area in said television screen at least as part of said display screen when the screen other than said television screen is being displayed and a screen area setting section for setting said specific area.

7. A display system as set forth in claim 6, further provided with a change detecting/notifying section for monitoring the image in said specific area set by said screen area setting section, detecting any change occurring in said image, and providing notification of that change.

8. A display system as set forth in claim 7, which performs at least one of the following when said change detecting/notifying section detects a change in said image:

(i) Notification of said change by sound or voice, (ii) Notification by television audio from a television device generating said television screen, (iii) Notification by converting the entire screen of the specific area by the television screen from the television device.

9. A display system as set forth in claim 7, wherein normally the entire screen of said display screen is set to said navigation screen and the entire screen of said display screen is changed to the television screen from a television device for generating said television screen only when a change in said image is detected by said change detecting/notifying section.

10. A display system as set forth in claim 6, wherein further provision is made of a screen area setting section for setting said specific area and said screen area setting section includes an image recognizing unit for setting said specific area in said television screen by extraction of features from the image data generating said television screen being received.

11. A display system as set forth in claim 10, wherein said screen area setting section includes an image area extracting unit for extracting image data of said specific area to be output to said image recognizing unit.

12. A display system as set forth in claim 11, wherein said image area extracting unit is provided with a function of setting the image of said specific area to any position in said television screen and a function of enlarging or reducing the image of said specific area by any ratio.

13. A display system as set forth in claim 6, wherein further provision is made of a screen area setting section for setting said specific area and said screen area setting section sets the display position of said specific area on said display screen for each television channel received.

14. A display system as set forth in claim 7, wherein further provision is made of a program detecting section for detecting that a desired program designated in advance has been received, and said program detecting section activates said screen switching section, said screen area setting section, and said change detecting/notifying section when detecting this.

15. A display system as set forth in claim 6, wherein further provision is made of a screen area setting section for setting said specific area, a television device for generating said television screen switches among a plurality of television channels by time division by a single tuner, and said screen switching section and said screen area setting section display the television screens corresponding to said plurality of television channels on said display screen.

* * * * *

UNITED STATES PATENT AND TRADEMARK OFFICE
CERTIFICATE OF CORRECTION

PATENT NO. : 6,868,332 B2
DATED : March 15, 2005
INVENTOR(S) : Hashimoto

It is certified that error appears in the above-identified patent and that said Letters Patent is hereby corrected as shown below:

<u>Title page,</u>
Item [75], Inventor, replace "Kobe" with -- Hyogo --.

<u>Column 8,</u>
Line 51, replace "systems" with -- system --.

Signed and Sealed this

Third Day of January, 2006

JON W. DUDAS
*Director of the United States Patent and Trademark Office*